Jan. 20, 1970   J. W. ARCHER ET AL   3,490,344
PRESSURE VESSEL
Filed July 10, 1967   5 Sheets-Sheet 1

PRIOR ART

INVENTORS J. W. ARCHER
F. J. FUCHS, JR.
BY Mann & Jangarathis
ATTORNEYS

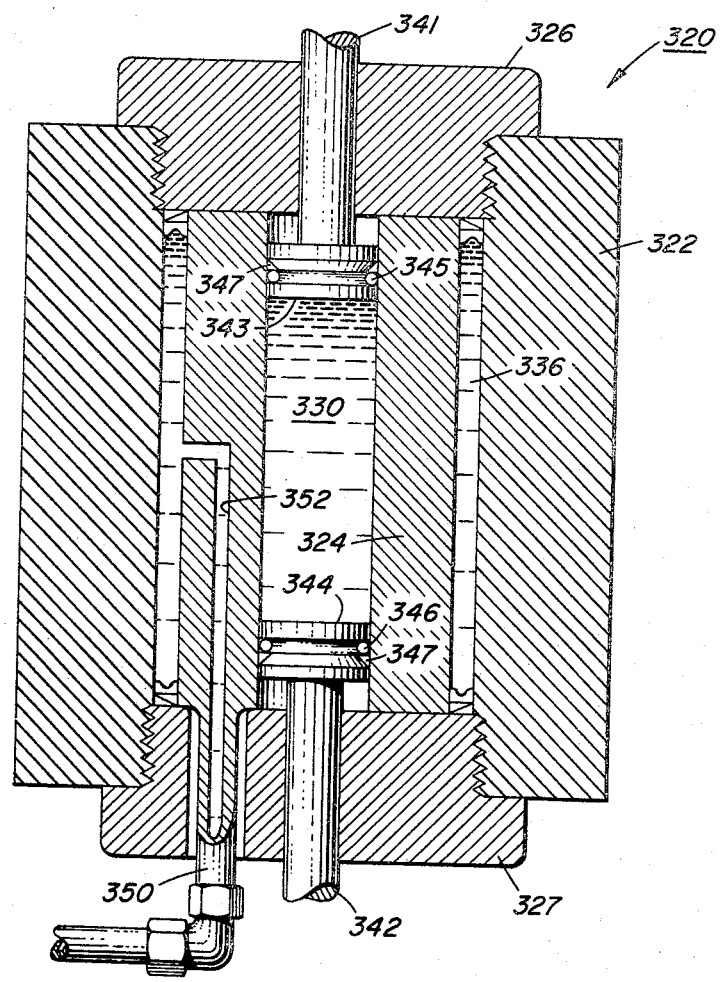

United States Patent Office

3,490,344
Patented Jan. 20, 1970

---

3,490,344
PRESSURE VESSEL
John Wesley Archer, Trenton, and Francis Joseph Fuchs, Jr., Princeton Junction, N.J., assignors to Western Electric Company, Incorporated, New York, N.Y., a corporation of New York
Filed July 10, 1967, Ser. No. 652,112
Int. Cl. F16j *11/04;* F01b *11/02;* F16l *55/04*
U.S. Cl. 92—171                                     15 Claims

ABSTRACT OF THE DISCLOSURE

The pressure vessel structure includes an outer support cylinder disposed concentrically around but displaced from a central support cylinder, with the space therebetween defining a fluid support chamber for receiving a body of pressurized support fluid to support a body of pressurized working fluid contained internally of the central support cylinder. The pressurized support fluid is provided to the fluid support chamber by a passageway formed longitudinally internally of the central support cylinder.

BACKGROUND OF THE INVENTION

Those concerned with the development of the metal forming art and other arts wherein ultra-high fluid pressures are required, have long recognized the need for fluid containing apparatus which are capable of withstanding ultra-high pressures. Limiting factors in the continuing effort to overcome the need have been the strength of the materials available for use, the sizes of apparatus required by the ultra-high stresses in elements of known configuration, and the relatively high expense involved in reducing apparatus size by providing stress-relieving but complex structural arrangements.

Considering first the limitation caused by material strengths, the present maximum fatigue strength in available steels is about 130,000 p.s.i. for unlimited cycles, and about 150,000 p.s.i. for approximately 100,000 cycles. In the absence of more, this obviously does not approach the strength required to support the ultra-high pressures presently under consideration.

Apparatus have been developed which can support the ultra-high pressures, but these have been unacceptably massive or relatively expensive and therefore prohibitive for some purposes. The latter include those devices which utilize such structure as shrink-fited concentric support cylinders (uses for which are still limited ideally to values less than twice the yield stress of the cylinder material) which require manufacture to very close tolerances with the expense attendant thereto, and those devices having facilities responsive to forces generated within the ultra-high pressure fluid cylinder for generating compensating forces to overcome the deleterious effects of the internal forces on the components of the device.

The apparatus which have been generally unacceptable because of the sizes of components necessary to support the ultra-high fluid pressure loads include those known multistage apparatus having spaced, cylindrical vessels provided concentrically around a central support cylinder with layers of pressurized fluid between the spaced cylinders to reduce tangential stress and provide support. The relatively large size of these apparatus is required by the necessity to compensate for structural limitations caused by the incidence of stress concentrations which have been found in the areas of fluid communication passages through the structural members, and which generally increase the magnitude of material stress by a factor of approximately 2.5 to 3.0.

Further, in the prior art pressure vessels which utilize a surrounding body of pressurized fluid to support or assist in supporting an internal body of pressurized fluid, no provision is made to permit independent control or independent pressurization of the two bodies of fluid. Typically, the surrounding support fluid is derived from the internal body of pressurized fluid or is pressurized by the same means which pressurizes the internal fluid, e.g., the pressure vessel disclosed in United States Patent No. 667,525, to J. Huber. Or, if such independent fluid control or pressurization is or can be said to be provided, the ratio of rate of relative fluid control or pressurization is fixed, e.g., the Hydrostatic Pressure Device disclosed in United States Patent No. 3,224,042, to M. Meissner.

SUMMARY OF THE INVENTION

It is the general object of the present invention, therefore, to provide pressure vessel structure which utilizes the structural advantages of multiple cylinders in combination with fluid pressure support, without being subject to the ordinarily incidental size problems, without being prohibitively complex, and without being uneconomical so as to render the apparatus prohibitive in cost.

This general object and others which will be readily apparent to those skilled in the art have been achieved by the present invention wherein there is provided in a pressure vessel having a working fluid chamber and a support fluid chamber, the chambers being separated by an internally positioned support member, means for providing fluid communication to said support fluid chamber from a source of pressurized fluid external to said pressure vessel, and which means includes a passageway formed in said internally positioned support member.

BRIEF DESCRIPTION OF THE DRAWING

The exact nature of the aforementioned problems and a more complete understanding of the present invention may be had from a consideration of the following detailed description thereof, particularly when read in view of the annexed drawings wherein:

FIG. 4 is a front elevational, cross-sectional view of another embodiment of a pressure vessel constructed in accordance with the teaching of the present invention;

THE PRIOR ART

Figure 1:
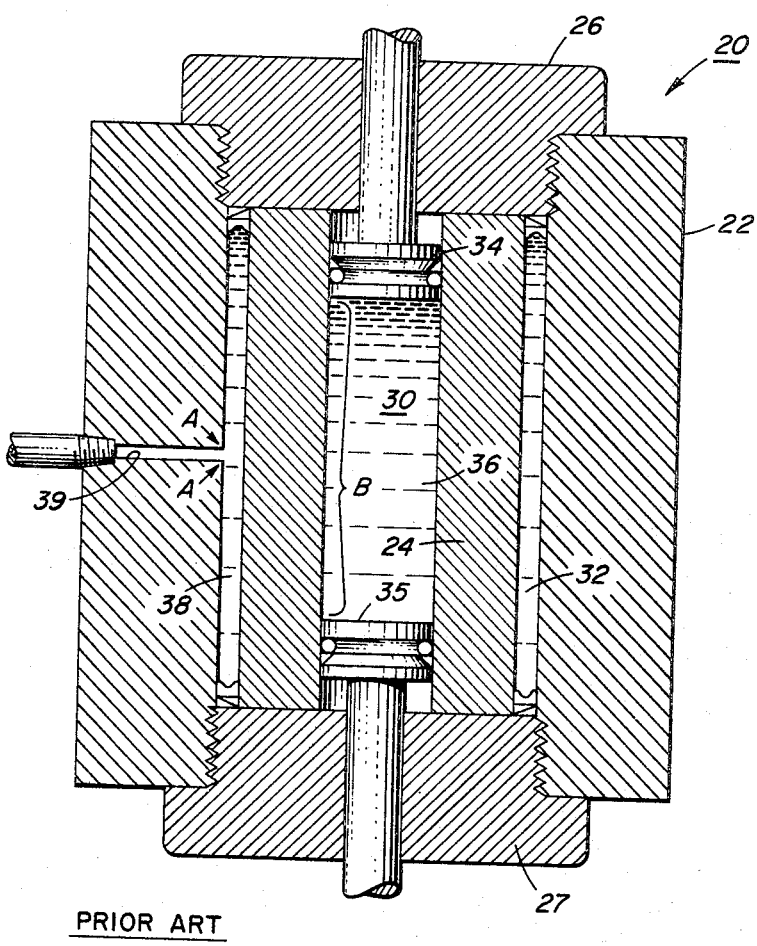
FIG. 1 is a front elevational, cross-sectional view of typical prior art apparatus.

Referring now to FIG. 1, there is shown a typical prior art pressure vessel comprising a concentric cylinder fluid pressure support vessel designated generally by the reference numeral 20. Broadly, vessel 20 comprises an outer support cylinder 22, a central support cylinder 24, and upper and lower plugs 26, 27 respectively, which plugs cooperate with the outer and central cylinders to define a central fluid chamber 30, and an outer fluid chamber 32.

The central fluid chamber 30 is the high pressure chamber and is provided with opposed reciprocable pistons 34 and 35 for pressurizing working fluid 36 contained therein. Outer fluid chamber 32 is for containing support fluid 38 which is introduced and pressurized through a radially extending passage 39 formed transversely through the outer cylinder 22.

The presence of passage 39 in outer cylinder 22 greatly limits the ability of the cylinder to contain highly pressurized fluids in comparison to a similar cylinder not provided with such a passage. This limitation results from stress concentrations which occur in the area of the opening of the passage through the pressure wall and which severely limit the pressure containing capacity of the cylinder.

For purposes of stress analysis, cylinders are categorizable generally as thick or thin walled, close or open ended, and where holes in the side are present, as having large or small holes. Generally, in apparatus of this type, the diameter of the hole in the side wall, here passage 39, is less than one tenth of the inside diameter of the support cylinder, thus categorizing such passages as small side holes. The provision of top and bottom plugs 26 and 27 makes categorization of the cylinders as open or close ended difficult since although longitudinal stresses are experienced in this structure, it is neither fully close ended nor fully open ended, but rather something between the two. For this analysis, however, the cylinder 22 will be considered an open ended cylinder, the assumption being fully adequate for present purposes. Thus, the cylinder 22 of FIG. 1 is an open ended, thick walled cylinder having a small side hole formed therein.

As is known to those skilled in this art, the maximum hoop stress of a radially loaded cylinder occurs at the inner surface of the cylinder. Further, where the cylinder is uninterrupted by holes, grooves or other irregularities, the maximum stress value is experienced uniformly around the entire inner surface of the cylinder. While the location of maximum stress does not change when a side hole is provided in the cylinder, uniform stress is no longer present around the entire inner cylinder surface, and concentrations of relatively high stress are experienced at the upper and lower edges of the side hole as indicated by the letters "A" in FIG. 1. The degree of stress concentration is represented by a value called a stress concentration factor.

Thus: $S_{hA}(max) = KS_h$ (1)

where:

$S_{hA}(max)$ is the maximum hoop stress at the inner surface of cylinder 22 at a point A on the edge of passage 39, $S_h$ is the hoop stress for a cylinder like cylinder 22 but without a side hole, and K is the stress concentration factor.

For a cylinder without holes, there is no stress concentration, however, for purposes of comparison, the stress concentration factor of such a cylinder can be considered to be unity. For a cylinder with small side holes, as is the case in the structure under consideration of FIG. 1, the stress concentration factor K is a function of the ratio of the outside radius of the cylinder to the inside radius of the cylinder, thus:

$$K = 3.0 - \left(\frac{R^2 - 1}{2R^2}\right)$$ (2)

where:

$R = \frac{r_2}{r_1}$ $r_2$ = the outside radius of cylinder 22 and
$r_1$ = the inside radius of cylinder 22.

As is known to those skilled in the art, the value of the stress concentration factor K ordinarily varies between 2.5 and 3.0 as determined from Equation 2. Thus it can be seen that the stresses in a cylinder having a small side hole are at least two and one-half times as great as those in a like cylinder without such a side hole. This condition obviously places severe limitations on the load capacity of prior art apparatus such as that shown in FIG. 1 and requires a relatively massive outer cylinder in comparison to what would be required in the absence of such a passage.

A further problem which has been experienced with prior art pressure vessels such as that shown in FIG. 1 is that loading on the central cylinder does not remain uniformly distributed. In FIG. 1, pistons 34 and 35 have diameters which are substantially equal to the inside diameter of central cylinder 24 and therefore there is no passage of fluid from chamber 30 therearound. Thus, only that inner surface having a longitudinal dimension designated by "B" is subjected to the pressure of fluid 36 in chamber 30. As fluid may be used or otherwise removed from chamber 30, pistons 34 and 35 extend farther into cylinder 24 thus reducing the volume of chamber 30 and the length of surface B against which the fluid acts. This, obviously, places a concentrated internal load on the central portion of cylinder 24, tending to deflect it radially outwardly, and places unopposed external loads on the end portions of cylinder 24 from the action of fluid 38 in chamber 32, which tend to deflect the cylinder ends radially inwardly. The combined forces against the central and end portions of cylinder 24 tend to warp the cylinder thereby increasing the likelihood of fluid leakage and piston binding.

DETAILED DESCRIPTION

Figure 2:
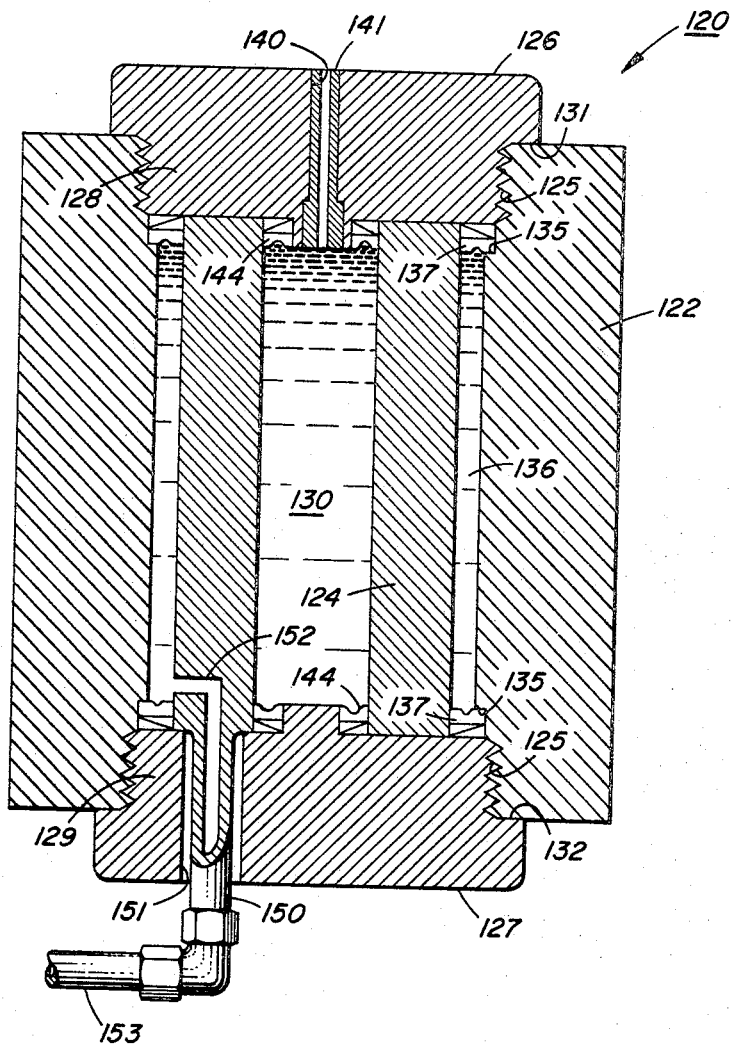
FIG. 2 is a front elevational, cross-sectional view of a pressure vessel according to the present invention.

Referring now to FIG. 2, there is shown a pressure vessel embodying the teaching of the present invention and designated generally by the numeral 120.

More particularly, the vessel 120 comprises an outer main support member, such as main support cylinder 122, a central support member, such as cylinder 124, which is positioned concentrically within but spaced from outer cylinder 122, and top and bottom end plugs 126, 127. End plugs 126, 127 are generally cylindrical and have threaded reduced portions 128, 129 respectively, the basic diameters of which threaded portions are smaller than the basic plug diameter and substantially equal to the inside diameters of annular channels 125 provided at each end of outer cylinder 122. Channels 125 are threaded for receiving the threaded portions 128, 129 of the end plugs 126, 127, and are provided with shoulders 135 at their inner ends for accommodating high pressure seals 137. Radially extending shoulder surfaces 131, 132 are provided on plugs 126, 127 between the small and large diameter portions. These shoulders cooperate with the ends of cylinder 122 to limit the insertion of the plugs into the cylinder and to provide a surface-to-surface engagement between the end plugs and the cylinder.

Central cylinder 124 extends from the bottom surface of top plug 126 to the top surface of bottom plug 127 and cooperates with the top and bottom plugs to define a first chamber 130 for containing pressurized working fluid. Additionally, central cylinder 124 cooperates with top and bottom end plugs 126, 127, and outer cylinder 122, to define a second fluid chamber 136 for containing pressurized support fluid. Ring seals 137, which may be of any of the high pressure types known in the art, e.g., the generally U-shaped Teflon cup seal with anti-extrusion rings as shown, are provided at the upper and lower surfaces of fluid chamber 136. These seals are received within the annular grooves defined by channels 125 and shoulders 135 of outer cylinder 122, and the end plugs 126, 127, and they are sized so as to tightly engage the surfaces of the inner cylinder and the respective end plug surfaces to preclude the leakage of support fluid out of second chamber 136.

Top end plug 126 is provided with a centrally disposed throughbore 140 which extends longitudinally axially from the outer plug surface to the inner surface of a boss 142 provided centrally on the inner surface of the plug. A counter bore 143 extends co-axially into bore 140 to a depth slightly greater than the thickness of boss 142. A high pressure fluid pipe 141 having an outer surface for being complementarily received within bores 140 and 143 is secured within top plug 126 such as by shrink fitting. The pipe 141, as will be discussed, defines a passage through which ultra-high pressure fluids, e.g., 300,000 p.s.i. may be introduced into working fluid chamber 130.

Similarly, bottom end plug 127 is also provided with a centrally disposed boss 145 on its inner surface. Boss 145, however, has no bore as it provided in boss 142.

Annular cup seals 144, of the same type as high pressure seals 137, are mounted at the top and bottom of chamber 130, and are in engagement with the inner surface of inner cylinder 124, the outer surfaces of bosses 142, 145, and the respective inner surfaces of top and bottom end plugs 126, 127. These seals prevent leakage of fluid from chamber 130, around inner cylinder 124, into chamber 136.

Inner cylinder 124 is provided with an integrally formed dependent pipe portion 150 having a passage 152 therein which passage extends upwardly into cylinder 124 and thereafter radially outwardly through the outer surface of the cylinder. Being integral with cylinder 124, pipe portion 150 allows communication of the high pressure support fluid without the incidence of undesirable stress concentrations within the vessel structure. The lower end of pipe 150 extends through a bore 151 formed in end plug 127 in spaced relation (so as to not transmit radial stresses to the bottom plug 127), and is threaded for connection with a high pressure fluid source pipe 153. Fluid source pipe 153 provides for the passage of fluid from a suitable independent source of pressurized support fluid (not shown) to chamber 136 through passage 152; the independent source of pressurized support fluid is independent in the sense that it is independent of, or not derived from, the pressurized working fluid. The support fluid source is such as to provide independently pressurized fluid in chamber 136 in response to the introduction and magnitudes of pressurized fluid in chamber 130, and of such magnitudes that the support fluid pressure in chamber 136 can be maintained at a pre-selected proportionate amount of the pressure of the working fluid in chamber 130. The exact mode of proportioning pressures in the outer chamber 136 with respect to pressures in the inner chamber 130 will be discussed hereinafter with respect to the embodiments of FIGS. 3 and 4.

In operation, top end plug 126 is removed and chambers 130 and 136 are filled with suitable fluids. Thereafter top seals 137 are positioned against shoulders 135, top seal 144 is positioned around pipe 141, and the top plug is threadedly secured to outer cylinder 122. Working fluid pressure is then impressed upon the fluid in chamber 130 and pressuer in chamber 136 is proportionately, but independently, increased in response thereto. When the system has reached operating levels the pressures in the inner and outer chambers can be, in some applications, ultra-high, e.g. 300,000 p.s.i. and above, however, in all applications whether ultra-high or low pressures are present, the pressure differential across the width of the inner cylinder wall thickness is relatively small. In this manner, stresses are maintained at low levels and thus the stress concentration at the point of entry of passage 152 into chamber 136 is relatively low.

The provision of support fluid entrance passage 152 through inner cylinder 124, rather than through outer cylinder 122, as was taught in the prior art, allows the outer cylinder to be a homogeneous or uninterrupted structure without holes or other structural discontinuities which cause the occurrence of stress concentrations. Thus, as was noted above, the stresses are reduced on the order of approximately 2.5 to 3, and corresponding reductions in the relative dimensions of the cylinder can be achieved.

Figure 3:
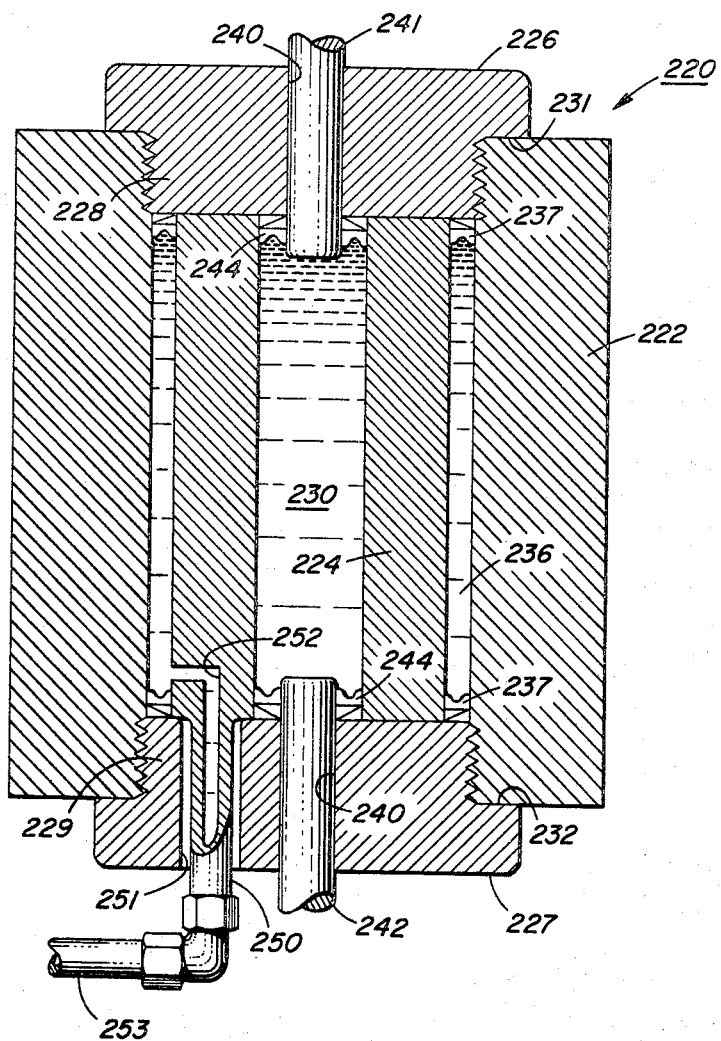
FIG. 3 is a front elevational, cross-sectional view of one embodiment of a pressure vessel constructed in accordance with the teaching of the present invention and including piston-cylinder apparatus.

Referring now to FIG. 3, there is shown a pressure vessel constructed according to the present invention, and including piston-cylinder apparatus for pressurizing the working fluid; the vessel being designated generally by the reference numeral 220.

More particularly, the pressure vessel 220 comprises an outer main support cylinder 222, a central cylinder 224 which is positioned concentrically within but spaced from outer cylinder 222, and top and bottom end plugs 226, 227. End plugs 226, 227 are generally cylindrical and have threaded reduced portions 228, 229 respectively, the basic diameters of which threaded portions are smaller than the basic plug diameter and substantially equal to the inside diameter of outer cylinder 222. The ends of the inner surface of central cylinder 224 are provided with inside threads for receiving the threaded portions 228, 229 of the end plugs 226, 227. Radially extending shoulder surfaces 231, 232 are provided on plugs 226, 227 between the small and large diameter portions. The shoulder surfaces 231, 232 cooperate with the ends of cylinder 222 to limit the insertion of the plugs into the cylinder and to provide a surface-to-surface engagement between the end plugs and the cylinder.

Central cylinder 224 extends from the bottom surface of top plug 226 to the top surface of bottom plug 227 and cooperates with the top and bottom plugs to define a first chamber 230 for containing pressurized working fluid. Additionally, central cylinder 224 cooperates with top and bottom end plugs 226, 227, and outer cylinder 222 to define a second fluid chamber, or fluid support chamber, 236 for containing independently pressurized support fluid. Ring seals 237, which, as in the embodiment of FIG. 2, may be of any of the high pressure types generally known in the art are, provided at the upper and lower surfaces of fluid chamber 236. These seals are sized so as to tightly engage the surfaces of the inner and outer cylinders as well as the respective end plug surfaces to preclude the leakage of support fluid out of second chamber 236.

Figure 5:
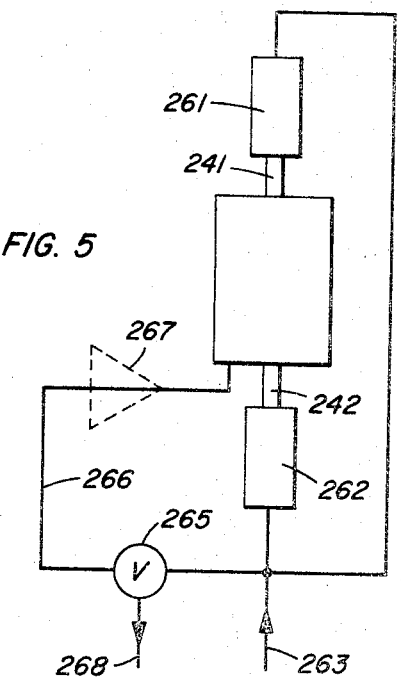
FIG. 5 is a diagrammatic representation of a control and motive system suitable for use with the pressure vessels of the present invention.

Top and bottom end plugs 226, 227 are each provided with a centrally disposed bore 240 for slidably receiving rams 241 and 242, respectively. Rams 241, 242 are smaller in diameter than the inner diameter of central cylinder 224, and are reciprocably driven by suitable fluid motors (such as shown schematically in FIG. 5) to compress or relieve the pressure on the working fluid in chamber 230. Sealing rings 244, which may be the same as rings 237, are mounted at the top and bottom of chamber 230 around rams 241, 242 adjacent end plugs 226, 227, to prevent leakage of fluid around rams from fluid chamber 230.

Inner cylinder 224 is provided with an integrally formed dependent pipe portion 250. The pipe portion 250 has a passage 252 therein which extends upwardly into cylinder 224 and thereafter radially outwardly through the outer surface of the cylinder. The lower end of pipe 250 extends through a bore 251 formed in end plug 227 and is threaded for connection with a high pressure fluid source pipe 253. Fluid source pipe 253 provides for the passage of fluid from a suitable source (not shown) to chamber 236 through passage 252.

In the operation of the pressure vessel of FIG. 3, and with the top end plug 226 initially removed, chambers 230, and 236 are filled with a working fluid. Thereafter, the seals 237 and 244 are positioned and top plug 226 is threadedly secured into rigid engagement with outer cylinder 222. After vessel 220 has been filled and securely assembled, the pressurization of the working fluid in chamber 230 can commence. Thus, referring to FIG. 5, there are shown fluid motors 261, 262 for reciprocably driving rams 241, 242. The fluid motors are driven by pressurized fluid provided through fluid line 263 from a suitable source of pressurized fluid (not shown). The source fluid is also provided to a proportioning valve 265, which may be for example the pressure regulator disclosed in the co-pending application of F. J. Fuchs, Jr., "Pressure Regulator," filed Sept. 9, 1966, Ser. No. 578,278, and assigned to the same assignee as the present application. Proportioning valve 265 supplies fluid either directly to the fluid support chamber through the fluid line 266, or through an intermediate pressure intensifier 267 (shown in dashed outline), to pressurize the fluid in outer chamber 236 (FIG. 3) through pipe 253 and passage 252. An exhaust line 268 (FIG. 5) is also provided on the proportioning valve 265, which line may be used to relieve the pressure in chamber 236 in response to a corresponding relief in the pressure in chamber 230.

In general, the proportioning valve 265 functions in such a manner that the output pressure therefrom is a selectable percentage of the input pressure thereto, and that the output pressure is maintained at the desired percentage notwithstanding variations in the input pressure. The particular percentage at which the valve is set for use with pressure vessels of this type will be determined from the pressures to be contained, the materials in question and what is determined to be an allowable stress in the cylinder materials. These values may be readily calculated by those having skill in the art, however, suffice it to say, the pressure in outer chamber 236 will always be a selectable percentage of the pressure in inner chamber 230, which pressure is determined by the pressure acting against rams 241, 242. Accordingly, depending upon such calculations, the pressure intensifier 267 of FIG. 5, may, or may not be required.

In order to intensify the fluid pressure in chamber 230, pressurized fluid is introduced into fluid line 263 and transmitted to fluid motors 261, 262 and proportioning valve 265. The pressure of the fluid in motors 261, 262 tends to displace rams 241, 242 inwardly of vessel 220 thereby exerting a pressure on the fluid in chamber 230. Concurrently with the tendency toward inward displacement of rams 241, 242, valve 265 proportions the pressure in line 263 to the pre-selected percentage as discussed above, and actuates pressure intensifier 265 if provided, which, in turn, provides an increase in the pressure in outer chamber 236 which is proportionate to the pressure in chamber 230. Thus it can be seen that for any pressure change in chamber 230, there will be a corresponding and proportionate change in the pressures in chamber 236. In this manner, it can be insured that stress concentrations in central cylinder 224 will not exceed a preselected limit in that the pressure differential between the working fluid acting against the inner surface of the central cylinder, and the support fluid acting against the outer surface of the central cylinder, is maintained within desired limits. Further, by introducing the support fluid to chamber 236 from within central cylinder 224 rather than in accordance with the prior art arrangements, stress concentrations in the outer cylinder 222 are minimized and the material thickness required for cylinder 222 will be substantially reduced from that required for prior art apparatus.

Those skilled in the art will recognize that it is not necessary to use a pressure proportioning valve such as valve 265 in order to obtain a desired pressure ratio between the fluid pressure in the inner and outer chambers 230, 236. By selectively relating the intensification ratio of intensifier 266 and the output ratio of fluid motors 261, 262, the desired inner and outer chamber pressure ratio can be achieved at operating conditions. The present arrangement, however, is considered to have a flexibility which may be desirable in the operation of the apparatus.

An additional feature of the embodiment of FIG. 3 is the provision for constant loading along the entire inner surface of central cylinder 224. Rams 241 and 242, as mentioned above, are of a diameter which is less than the inner diameter of central cylinder 224. Accordingly, notwithstanding the amount of advancement of the ram into chamber 230, the fluid pressure therein is distributed uniformly around rams 241, 242 to the entire inner surface of the central cylinder. This structural relationship obviates the above-noted problems of warping and deflection as described with respect to the prior art central cylinders.

It is to be recognized, however, that piston-less rams such as the rams 241, 242 of FIG. 2 are not always desirable or feasible under certain conditions. Thus, there is shown in FIG. 4, an embodiment of a pressure vessel, designated generally by the reference numeral 230, which is provided with conventional pistons for pressurizing the working fluid in an inner chamber 330.

More specifically, apparatus 320 comprises an outer main support cylinder 322, a central cylinder 324 which is positioned concentrically within but spaced from outer cylinder 322, and top and bottom end plugs 326, 327 respectively. End plugs 327 and 326 are threadedly received within outer cylinder 322 in the same manner as was described with respect to the apparatus of FIG. 3. Further, as in the apparatus of FIG. 3, end plugs 326, 327, central cylinder 324 and outer cylinder 322 cooperate to define a support fluid chamber 336.

Opposed rams 341, 342 are slidably mounted through end caps 326, 327 and are provided with pistons 343, 344 mounted on their respective inner ends. Pistons 343, 344 are in snug sliding engagement with the inner surface of central cylinder 324 and cooperate therewith to define a working fluid chamber 330. Leakage of working fluid from chamber 330 around pistons 343 and 344 is prevented by suitable O-ring seals 345 which are mounted in annular groove 346 with suitable anti-extrusion sings 347 in the outer peripheral surfaces of the pistons.

Support fluid is introduced to chamber 336 through a passage 352 in central cylinder 324 and dependent pipe 350 in the same manner as described with respect to the apparatus of FIG. 3. It is to be noted, however, that passage 352 extends generally to the longitudinal center of cylinder 324, whereafter it extends radially outwardly to chamber 336. Thus, no matter what the position of pistons 343, 344 in the pressurization cycle, opposed fluid pressures will always be acting upon the surfaces of the inner cylinder in the general area of the opening of passage 352 into chamber 336.

The operation of the embodiment of the pressure intensifier as shown in FIG. 4 is exactly the same as that described with respect to the embodiment of FIG. 3 and no further discussion is believed to be necessary.

It will be recognized by those skilled in the art that the pressure vessel structure of the present invention is a distinct improvement over prior art apparatus in that the novel fluid passage arrangement reduces the effect of stress concentrations in the fluid cylinders, thus reducing the size of the cylinders required to carry the fluid loads, and providing a vessel of sounder structural integrity. Further, the elimination of conventional pistons in the embodiment of FIG. 3 substantially eliminates cylinder warping with its attendant disadvantages.

Figure 6:
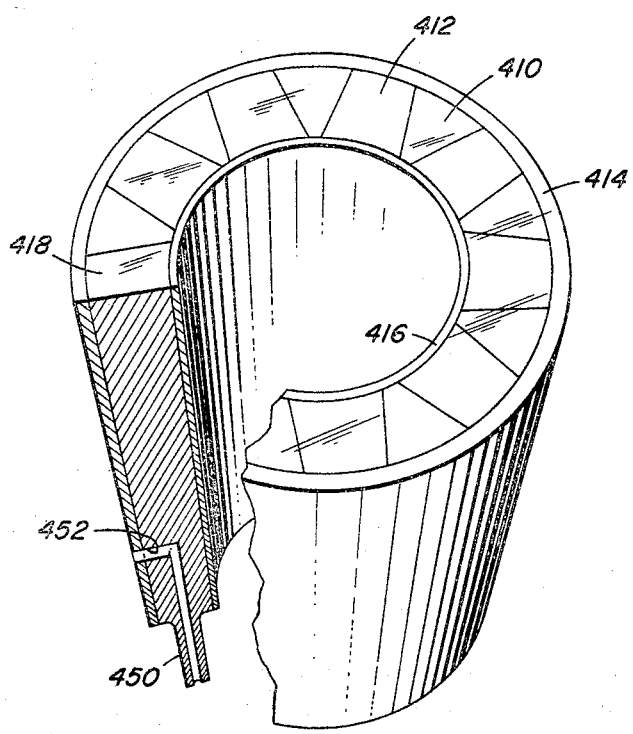
FIG. 6 is a view, in perspective and with parts broken away, of an alternate embodiment of an inner cylinder which comprises a segmented cylinder.

It will be recognized by those skilled in the art that although the present disclosure has been presented in terms of the inner or central cylinders being unitary structures, the teaching of the present invention is equally applicable to pressure vessels having inner cylinders comprising a segmented cylinder of the type shown in FIG. 6, which segmented cylinder comprises a plurality of longitudinally extending, complementarily shaped wedges 410 and 412. Such segmented inner cylinders provide the additional advantage of virtually eliminating the unwanted and debilitative effects of tangential or hoop stresses, and thus facilitate increased load capacities of the pressure vessels in which they are used.

As shown in FIG. 6, the wedges are maintained in their structural relationship by thin walled confining cylinders 414 and 416. One of the wedges, wedge 418, is provided with a dependent pipe portion 450, and formed through the pipe portion and longitudinally of the wedge 418 is a fluid passageway 452 for communicating a source of support fluid to a fluid support chamber.

The structural elements of the present invention, e.g. the end plugs, outer and inner cylinders and pistons may be manufactured by machining suitable materials such as 18% Ni maraging steel. Further, the pressure vessel of the present invention requires no specific mode of manufacture, and numerous modes of manufacture will be appreciated by those skilled in the art.

Manifestly, many modifications and variations may be made in the present invention without departing from the spirit and scope thereof.

What is claimed is:

1. In a pressure vessel including an outer wall and an inner wall, the inner wall dividing the pressure vessel into a working fluid chamber and a support fluid chamber, the inner wall surrounding the working fluid chamber, the improvement comprising:
   means for communicating said support fluid chamber with a source of pressurized fluid external to said pressure vessel, said means including a passageway formed within said inner wall the mouth of which passageway opens into the outer surface of said inner wall.

2. The pressure vessel as claimed in claim 1 wherein said passageway comprises intersecting longitudinal and lateral bores within said inner wall.

3. In a pressure vessel including an outer wall and an inner wall dividing the pressure vessel into a central working fluid chamber and an outer support fluid chamber, the inner wall surrounding the central working fluid chamber, and which inner wall is supportable on opposite sides by fluids to be received in said chambers and which fluids tend to maintain said inner wall in compressional stress such that the pressure differential across said inner wall is small, the improvement comprising:
   means for communicating said outer support fluid chamber with a source of pressurized support fluid, said means including a passageway formed within said inner wall and the mouth of which passageway opens into the outer surface of said inner wall.

4. A pressure vessel for supporting a body of pressurized fluid, comprising:
   a first open-ended support member;
   a second open-ended support member positioned internally of and spaced from said first support member;
   means for closing the ends of said first and second support members;
   said closing means cooperating with said second support member to define a first chamber for containing a first fluid under pressure, and cooperating with said first and second support members to define a second chamber; and
   said second support member including means within the wall of said second support member for communicating said second chamber with a source of independently pressurized support fluid.

5. The pressure vessel as claimed in claim 4 wherein said first open-ended support member is a first cylinder and said second open-ended support member is a second cylinder.

6. The pressure vessel as claimed in claim 5 wherein said means for communicating said second chamber with a source of independently pressurized support fluid, is a passageway formed longitudinally of said second cylinder.

7. The pressure vessel as claimed in claim 5 and further including a pipe portion integral with and dependent from said second cylinder, and wherein said means for communicating said second chamber with a source of independently pressurized support fluid extends within said pipe portion.

8. The pressure vessel as claimed in claim 7 wherein one of said means for closing the ends of said first and second cylinders has an opening formed therein for receiving said pipe portion therethrough in spaced relationship.

9. A pressure vessel, comprising:
   a first cylinder;
   a second cylinder positioned concentrically within and spaced from said first cylinder;
   means for closing the ends of said first and second cylinders;
   said closing means cooperating with said second cylinder to define a first chamber for containing a first fluid under pressure, and cooperating with said first and second cylinders to define a second chamber;
   means in the wall of said second cylinder for communicating said second chamber with a source of independently pressurized second fluid; and
   means in said first chamber for pressurizing said first fluid.

10. The pressure vessel as claimed in claim 9 wherein said pressurizing means comprises at least one ram reciprocably mounted in said second cylinder, said ram having an outside diameter less than the inside diameter of said second cylinder.

11. The pressure vessel as claimed in claim 9 wherein said pressurizing means comprises at least one piston reciprocably mounted in said second cylinder, said piston having an outside diameter substantially equal to the inside diameter of said second cylinder.

12. The pressure vessel as claimed in claim 9 wherein said means for communicating said second chamber with a source of independently pressurized second fluid, is a passageway formed in said second cylinder.

13. The pressure vessel as claimed in claim 9 and further including a pipe portion integral with and dependent from said second cylinder, and wherein said means for communicating said second chamber with a source of independently pressurized second fluid extends within said pipe portion.

14. The pressure vessel as claimed in claim 9 wherein said second cylinder comprises a radially segmented cylinder.

15. The pressure vessel is claimed in claim 14 wherein said segmented cylinder comprises a plurality of longitudinally extending, complementarily shaped wedges, one of said wedges having a dependent pipe portion and said one wedge and said pipe portion having a passageway for communicating said second chamber with said independently pressurized source of second fluid.

References Cited

UNITED STATES PATENTS

| | | | |
|---|---|---|---|
| 2,235,070 | 3/1941 | Giern et al. | 92—169 |
| 2,365,162 | 12/1944 | Abrams | 92—169 X |
| 2,518,787 | 8/1950 | Huhtala | 92—164 |
| 2,724,368 | 11/1955 | Miller | 92—168 X |
| 2,840,399 | 6/1958 | Harless et al. | 29—421 X |
| 2,934,093 | 4/1960 | Bleasdale | 92—171 X |
| 3,167,204 | 1/1965 | Rouse | 138—148 X |
| 3,224,042 | 12/1965 | Meissner | 100—269 X |
| 3,248,879 | 5/1966 | Natho | 138—31 X |

MARTIN P. SCHAWADRON, Primary Examiner

I. C. COHEN, Assistant Examiner

U.S. Cl. X.R.

92—75, 169; 138—31, 148; 220—3

L-566-PT
(6-69)

UNITED STATES PATENT OFFICE
CERTIFICATE OF CORRECTION

Patent No. 3,490,344      Dated January 20, 1970

Inventor(s) John Wesley Archer - Francis Joseph Fuchs, Jr.

It is certified that error appears in the above-identified patent and that said Letters Patent are hereby corrected as shown below:

In the specification, column 2, line 11, "of" (first occurrence) should have been --or--. Column 5, line 10, "it" should have been --is--. Column 8, line 9, "230" should have been --320--; line 32, "sings" should have been --rings--.

In the claims, Column 10, line 44, "is" should have been --as--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents